United States Patent
Straeussnigg

(10) Patent No.: US 9,632,753 B2
(45) Date of Patent: Apr. 25, 2017

(54) SPECTRAL SHAPING OF PSEUDORANDOM BINARY SEQUENCE

(71) Applicant: Infineon Technologies AG, Neubiberg (DE)

(72) Inventor: Dietmar Straeussnigg, Villach (AT)

(73) Assignee: Infineon Technologies AG, Neubiberg (DE)

( * ) Notice: Subject to any disclaimer, the term of this patent is extended or adjusted under 35 U.S.C. 154(b) by 202 days.

(21) Appl. No.: 14/674,770

(22) Filed: Mar. 31, 2015

(65) Prior Publication Data

US 2016/0291935 A1 Oct. 6, 2016

(51) Int. Cl.
*G06G 7/58* (2006.01)
*G06F 7/58* (2006.01)

(52) U.S. Cl.
CPC .................... *G06F 7/582* (2013.01)

(58) Field of Classification Search
None
See application file for complete search history.

(56) References Cited

U.S. PATENT DOCUMENTS

| 5,903,598 A * | 5/1999 | Hunsinger | H04B 1/406 370/208 |
| 6,173,003 B1 * | 1/2001 | Whikehart | G06F 1/02 375/130 |
| 2007/0013566 A1 * | 1/2007 | Chuang | H03M 3/34 341/143 |
| 2007/0098049 A1 * | 5/2007 | Sharp | H04B 1/69 375/146 |
| 2015/0061911 A1 * | 3/2015 | Pagnanelli | H03M 3/358 341/144 |
| 2016/0291935 A1 * | 10/2016 | Straeussnigg | G06F 7/582 |

* cited by examiner

*Primary Examiner* — David H Malzahn
(74) *Attorney, Agent, or Firm* — Slater Matsil, LLP

(57) ABSTRACT

A pseudorandom binary sequence having a first sampling rate is generated. Based on the pseudorandom binary sequence, a digital filter generates a spectrally shaped pseudorandom binary sequence having a second sampling rate. The second sampling rate is equal to the first sampling rate multiplied by an integer upsampling factor of L>1. The digital filter includes L filter branches consisting of a first subset of one or more filter branches and a second subset of one or more filter branches. Each filter branch of the first subset generates a binary output which is equal to an input of the filter branch. Each filter branch of the second subset generates a binary output which is inverted with respect to an input of the filter branch.

20 Claims, 10 Drawing Sheets

SPECTRAL SHAPING OF PSEUDORANDOM BINARY SEQUENCE

TECHNICAL FIELD

The present application relates to generation of a spectrally shaped pseudorandom binary sequence and to devices in which a spectrally shaped pseudorandom binary sequence is generated.

BACKGROUND

For various kinds of applications, it is known to utilize a pseudorandom binary sequence. Examples of such applications are dithering, chopping, and spread spectrum technologies.

Typically, the pseudorandom binary sequence is generated to approximate white noise characteristics. However, in some scenarios spectral shaping of the pseudorandom binary sequence may be desirable. While such spectral shaping may be accomplished by filtering of a pseudorandom binary sequence having white noise characteristics, such digital filtering may result in an significant increase of circuit complexity. For example, the filtering may result in conversion of a single bit pseudorandom binary sequence to a multi-bit signal, and such multi-bit signal may not be directly applicable for the intended purpose, e.g., chopping by controlling a switch. Accordingly, a conversion of the multi-bit signal to a single bit signal may be necessary, which adds complexity. In other cases, the multi-bit signal may be utilized as such, but requires utilization of more complex components than in the case of a single bit signal. For example, if the pseudorandom binary sequence is applied for dithering, utilization of a multi-bit digital-to-analog converter (DAC) instead of a single bit DAC may be required.

Accordingly there is a need for techniques which allow for efficiently generating a spectrally shaped pseudorandom binary sequence.

SUMMARY

According to an embodiment, a pseudorandom binary sequence having a first sampling rate is generated. Based on the pseudorandom binary sequence, a digital filter generates a spectrally shaped pseudorandom binary sequence having a second sampling rate. The second sampling rate is equal to the first sampling rate multiplied by an integer upsampling factor of L>1. The digital filter comprises L filter branches consisting of a first subset of one or more filter branches and a second subset of one or more filter branches. Each filter branch of the first subset generates a binary output which is equal to an input of the filter branch. Each filter branch of the second subset generates a binary output which is inverted with respect to an input of the filter branch.

According to further embodiments of the invention, other devices or methods may be provided. Such embodiments will be apparent from the following detailed description in connection with the accompanying drawings.

DETAILED DESCRIPTION

Figure 1:
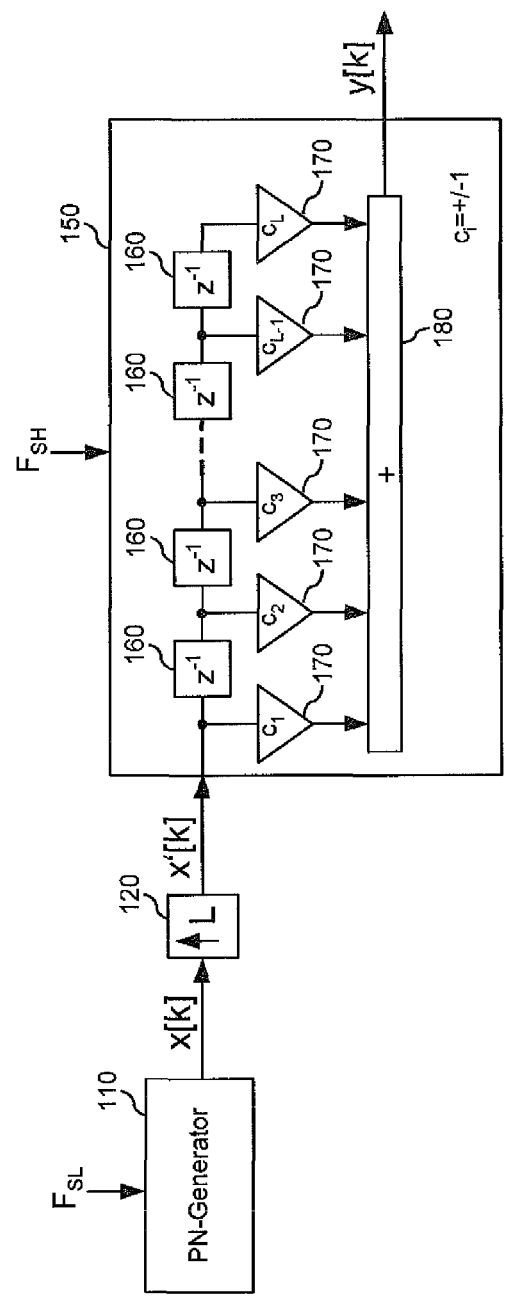
FIG. 1 schematically illustrates a device according to an embodiment of the invention.

In the following, various embodiments will be described in detail with reference to the accompanying drawings. It should be noted that these embodiments serve only as examples and are not to be construed as limiting. For example, while embodiments with a plurality of features, other embodiments may comprise less features and/or alternative features. Furthermore, features from different embodiments may be combined with each other unless specifically noted otherwise.

Embodiments as illustrated in the following relate to generation of a spectrally shaped pseudorandom binary sequence and correspondingly configured devices, e.g., pseudorandom sequence generators or devices equipped with a pseudorandom sequence generator. The spectrally shaped pseudorandom binary sequence may be based on an original pseudorandom binary sequence generated by a linear feedback shift register (LFSR). However, other kinds of pseudorandom sequence generators (PN-generators) could be utilized as well.

In the illustrated examples, a digital filter generates the spectrally shaped pseudorandom binary sequence based on an original pseudorandom binary sequence. The original pseudorandom binary sequence has a first sampling rate, and the spectrally shaped pseudorandom binary sequence has a second sampling rate which is increased with respect to the first sampling rate by an integer upsampling factor of L>1. The digital filter has L filter branches which consist of a first subset of one or more filter branches and a second subset of one or more filter branches. Each filter branch of the first subset is configured to generate a binary output which is equal to an input of the filter branch. For example, if the input of the filter branch corresponds to either 1 or −1, the binary output of the filter branch would correspond to 1 or −1, respectively. In another example, if the input of the filter branch corresponds to either 1 or 0, the binary output of the filter branch would correspond to 1 or 0, respectively. Such behavior may be achieved by configuring the filter branch to accomplish a multiplication by a filter coefficient of 1. Each filter branch of the second is configured to generate a binary output which is inverted with respect to an input of the filter branch. For example, if the input of the filter branch corresponds to either 1 or −1, the binary output of the filter branch would correspond to −1 or 1, respectively. Such behavior may be achieved by configuring the filter branch to accomplish a multiplication by a filter coefficient of −1. In another example, if the input of the filter branch corresponds to either 1 or 0, the binary output of the filter branch would correspond to 0 or 1, respectively. Such behavior may be achieved by configuring the filter branch to accomplish a binary inversion operation.

Due to the upsampling and the characteristics of the filter branches, it can be achieved that the spectrally shaped pseudorandom binary sequence is generated with the same bit length as the original pseudorandom binary sequence. For example, if the original pseudorandom binary sequence is a single bit signal, also the spectrally shaped pseudorandom binary sequence may be generated as a single bit signal. This allows for applying the spectrally shaped pseudorandom binary sequence for directly controlling one or more switches, e.g., for the purpose of chopping a signal, or for utilizing the spectrally shaped pseudorandom binary sequence in connection with low complexity components, such as a single bit DAC.

FIG. 1 schematically illustrates an example of a device operating according to the above-mentioned principles. As illustrated, the device includes a PN-generator 110, e.g., based on an LFSR. The PN-generator 110 generates the original pseudorandom binary sequence x[k] at the first sampling rate, in FIG. 1 denoted by $F_{SL}$. In the example of FIG. 1, it is assumed that the original pseudorandom binary sequence x[k] is formed of samples having either a value of 1 or a value of −1.

Further, the device includes an upsampling stage 120. The upsampling stage 120 receives the original pseudorandom binary sequence x[k] and performs upsampling of the original pseudorandom binary sequence x[k] by the upsampling factor L. This is accomplished by zero stuffing, i.e., by generating from the pseudorandom binary sequence x[k] an upsampled pseudorandom binary sequence x'[k] having the second sampling rate, in FIG. 1 denoted by $F_{SH}$, which is increased by the upsampling factor L. The upsampled pseudorandom binary sequence x'[k] includes the samples of the original pseudorandom binary sequence x[k], separated by L−1 samples having the value zero.

Further, the device includes a digital filter 150 operating at the second sampling rate $F_{SH}$. As illustrated, the digital filter 150 includes a series of delay registers 160 which receive the upsampled pseudorandom binary sequence x'[k]. In particular, a first delay register 160 of the series receives the upsampled pseudorandom binary sequence x'[k], delays it by one sample duration, and then passes it to the next delay register 160 of the series, if present. The next delay register 160 of the series receives the delayed upsampled pseudorandom binary sequence x'[k], delays it by one sample duration, and then passes it to the next delay register 160 of the series, if present. This sequential delaying of the upsampled pseudorandom binary sequence x'[k] continues until the last delay register 160 of the series is reached. The number of the delay registers 160 is L−1. Accordingly, at least one delay register 160 is present. Depending on the filtering characteristics needed for obtaining a desired spectral shaping, the number of the delay registers 160 may be increased, and the upsampling factor L be adapted accordingly.

At the input of the first delay register 160 of the series, and at the output of each of the delay registers 160 of the series, a tap is provided which feeds a corresponding filter branch of the digital filter 150. In the illustrated example, the digital filter 150 provides L filter branches. Each filter branch includes a digital multiplier 170 to accomplish a multiplication by a corresponding filter coefficient $c_i$, with i=1, . . . , L. Outputs of the filter branches are fed to a summation stage 180, which sums the outputs of all filter branches to generate the spectrally shaped pseudorandom binary sequence z[k]. The spectrally shaped pseudorandom binary sequence z has the second sampling rate $F_{SH}$.

As indicated in FIG. 1, the filter coefficients $c_i$ are either 1 or −1. If the filter coefficient $c_i$ of a certain filter branch is 1, the output of the filter branch is equal to the input of the filter branch, apart from any delay associated with the multiplication. If the filter coefficient $c_i$ of a certain filter branch is −1, the output of the filter branch is inverted with respect to the input of the filter branch, apart from any delay associated with the multiplication. Due to the upsampling with zero stuffing, only one of the filter branches contributes to each sample of the spectrally shaped pseudorandom binary sequence z[k]. Accordingly, the samples of the spectrally shaped pseudorandom binary sequence z[k] will have values of either 1 or −1, like in the original pseudorandom binary sequence z[k]. That is to say, both the original pseudorandom binary sequence x[k] and the spectrally shaped pseudorandom binary sequence z[k] have the same bit length. In particular, both the original pseudorandom binary sequence x[k] and the spectrally shaped pseudorandom binary sequence z[k] are single bit signals.

Figure 2:
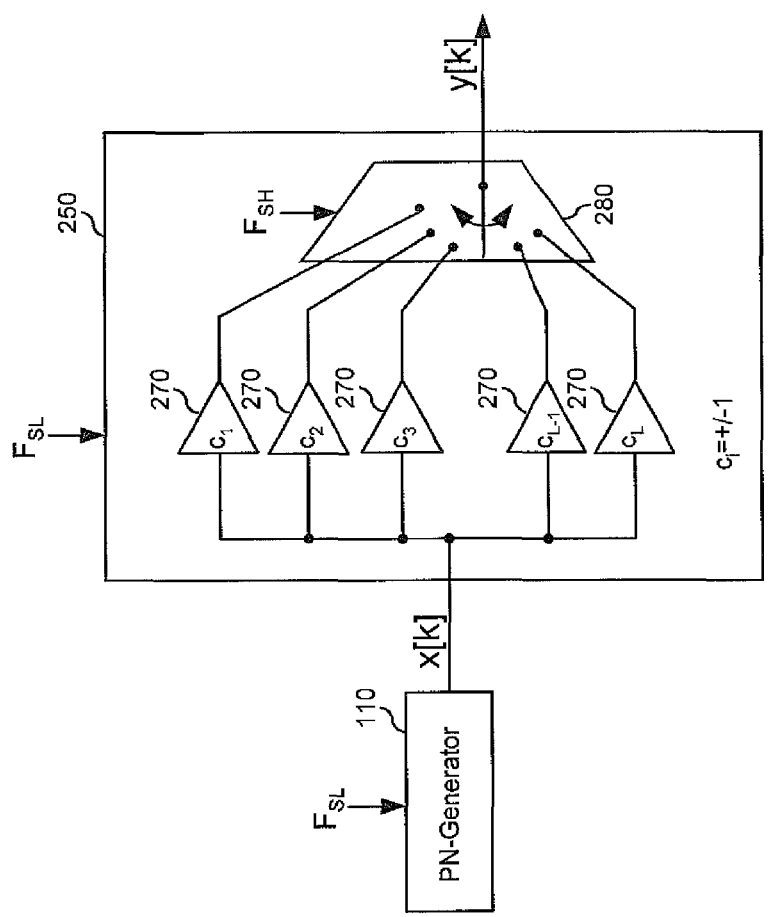
FIG. 2 schematically illustrates an implementation of device according to an embodiment of the invention, which is based on a polyphase digital filter.

FIG. 2 schematically illustrates a further example of a device operating according to the above-mentioned principles. Similar to the device of FIG. 1, the device includes a PN-generator 110, e.g., based on an LFSR. The PN-generator 110 generates the original pseudorandom binary sequence x[k] at the first sampling rate, again denoted by $F_{SL}$. Also in the example of FIG. 2, it is assumed that the original pseudorandom binary sequence x[k] is formed of samples having either a value of 1 or a value of −1.

Further, the device includes a digital filter 250. The digital filter 250 is implemented as a polyphase filter. As illustrated, the digital filter 250 includes L filter branches which receive the original pseudorandom binary sequence x[k] in parallel. That is to say, a sample of the original pseudorandom binary sequence x[k] is simultaneously fed as input to each of the filter branches. Each filter branch includes a digital multiplier 270 to accomplish a multiplication by a corresponding filter coefficient $c_i$, with i=1, . . . , L. Outputs of the filter branches are fed to a multiplexer 280, which sequentially selects the output of one of the filter branches. In the illustrated example, it is assumed that the multiplexer operates as a rotating switch. That is to say, according to a periodic pattern the multiplexer 280 selects one of the filter branches after the other to generate the spectrally shaped pseudorandom binary sequence z[k]. The multiplexer 280 operates at the second sampling rate $F_{SH}$, and the spectrally shaped pseudorandom binary sequence z[k] obtained at the output of the multiplexer 280 thus has the second sampling rate $F_{SH}$. The multiplexer 280 thus also accomplishes upsampling to the second sampling rate $F_{SH}$, however in this case without zero stuffing. As also indicated in FIG. 2, while the multiplexer 280 operates at the second sampling rate $F_{SH}$, other portions of the digital filter 250 only need to operated at the lower first sampling rate $F_{SL}$.

As indicated in FIG. 2, the filter coefficients $c_i$ are either 1 or −1. If the filter coefficient $c_i$ of a certain filter branch is 1, the output of the filter branch is equal to the input of the filter branch, apart from any delay associated with the multiplication. If the filter coefficient $c_i$ of a certain filter branch is −1, the output of the filter branch is inverted with respect to the input of the filter branch, apart from any delay associated with the multiplication. Due to the operation of the multiplexer 280, only one of the filter branches contributes to each sample of the spectrally shaped pseudorandom binary sequence z[k]. Accordingly, the samples of the spectrally shaped pseudorandom binary sequence z will have values of either 1 or −1, like in the original pseudorandom binary sequence x[k]. That is to say, both the original pseudorandom binary sequence x[k] and the spectrally shaped pseudorandom binary sequence z[k] have the same bit length. In particular, both the original pseudorandom binary sequence x[k] and the spectrally shaped pseudorandom binary sequence z[k] are single bit signals.

Figure 3:
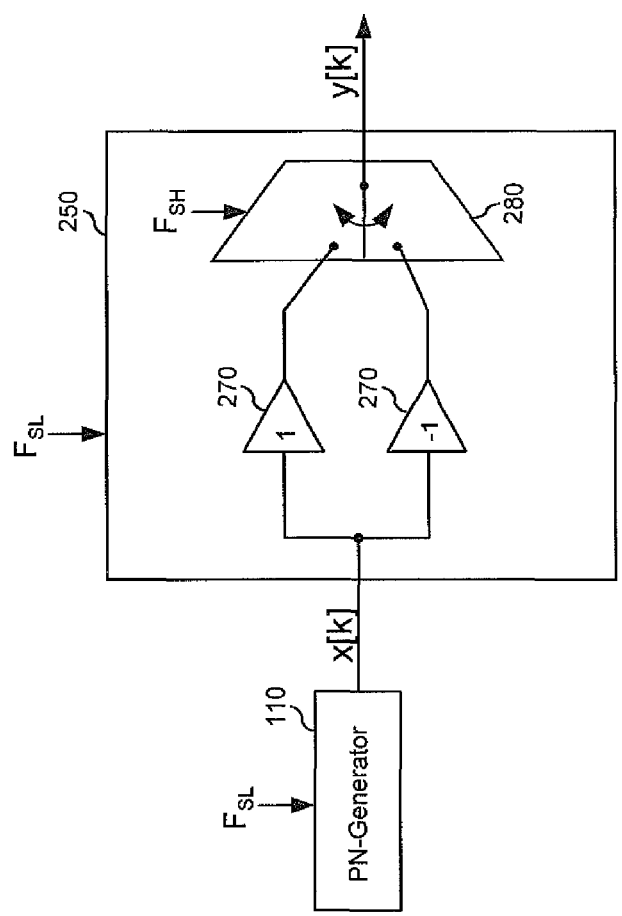
FIG. 3 shows a device according to an embodiment of the invention, which is based on a digital filter having a first order high pass filter characteristic.

FIG. 3 shows an example of a device based on the architecture of FIG. 2, in which the digital filter 250 provides a first order high pass filter characteristic or first order differentiator characteristic. This is achieved by a configuration of the digital filter 250 with two filter branches, i.e., L=2. The filter coefficient of the first filter branch is $c_1=1$, while the filter coefficient of the second filter branch is $c2=_{-1}$. This implements a transfer function of the digital filter 250 which is given by $$H(z) = \frac{Z\{y[k]\}}{Z\{x[k]\}} = (1 - z^{-1}), \quad (1)$$

where $Z\{x[k]\}$ denotes the Z-transformation of x[k] and $Z\{y[k]\}$ denotes the Z-transformation of y[k].

Figure 4:
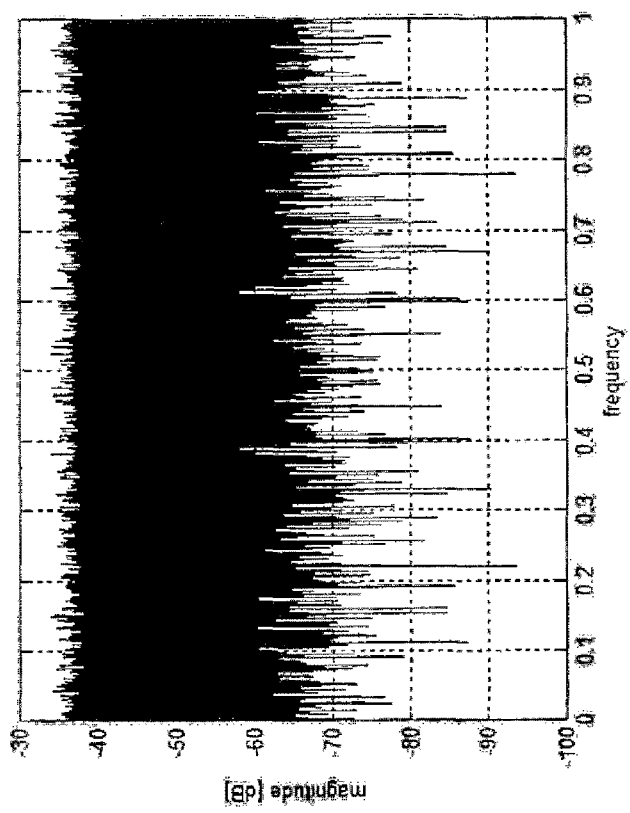
FIG. 4 shows an FFT (Fast Fourier Transform) spectrum of a pseudorandom binary sequence without spectral shaping.

FIG. 4 shows an example of an FFT spectrum of the original pseudorandom binary sequence x[k], with the frequency being denoted units of $F_{SL}$. As can be seen, the FFT spectrum of the pseudorandom binary sequence x[k] substantially corresponds to a white noise characteristic, i.e., has a substantially uniform distribution up to $F_{SL}$.

Figure 5:
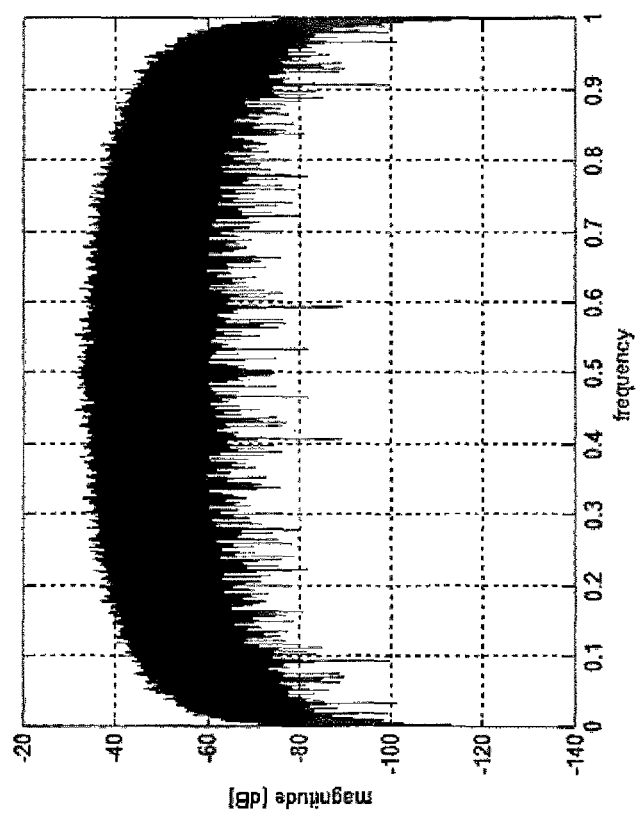
FIG. 5 shows an FFT spectrum of a pseudorandom binary sequence with spectral shaping using to a digital filter configuration as shown in FIG. 3.

FIG. 5 shows an example of an FFT spectrum of the spectrally shaped pseudorandom binary sequence y[k] as obtained when utilizing a digital filter configuration as illustrated in FIG. 3, i.e., a digital filter having a first order high pass characteristic. In FIG. 4, the frequency is denoted units of $F_{SH}$. As can be seen, the FFT spectrum shows damping towards low frequencies.

Figure 6:
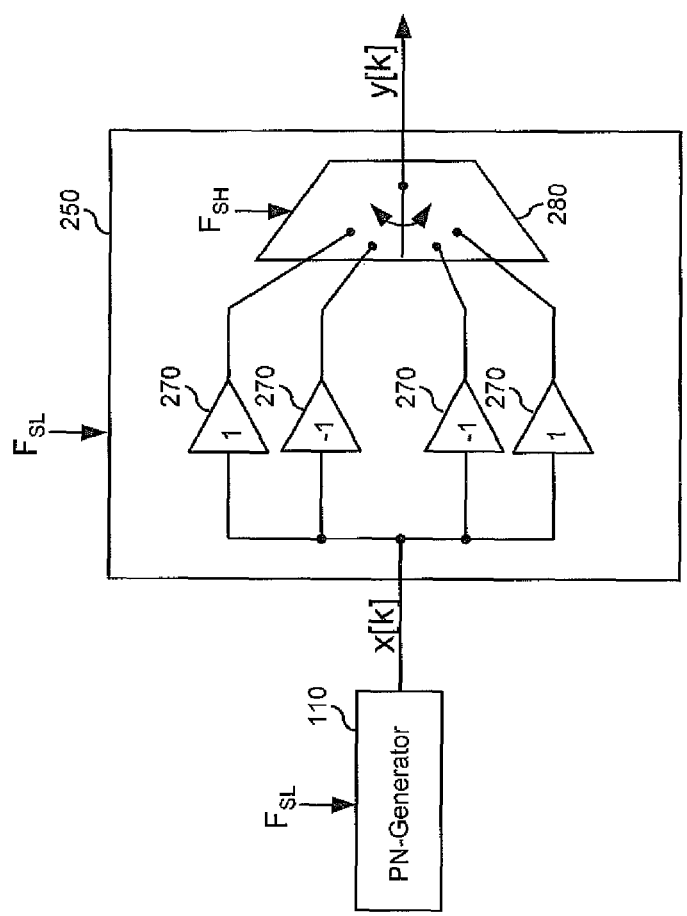
FIG. 6 shows a device according to an embodiment of the invention, which is based on a digital filter having a second order high pass filter characteristic.

FIG. 6 shows an example of a further device based on the architecture of FIG. 2, in which the digital filter 250 provides a second order high pass filter characteristic. This is achieved by a configuration of the digital filter 250 with four filter branches, i.e., L=4. The filter coefficient of the first filter branch is $c_1=1$, the filter coefficient of the second filter branch is $c_2=-1$, the filter coefficient of the third filter branch is $c_3=-1$, and the filter coefficient of the fourth filter branch is $c_4=1$. This implements a transfer function of the digital filter 250 which is given by $$H(z) = \frac{Z\{y[k]\}}{Z\{x[k]\}} = (1 - z^{-1} - z^{-2} + z^{-3}). \quad (2)$$

Figure 7:
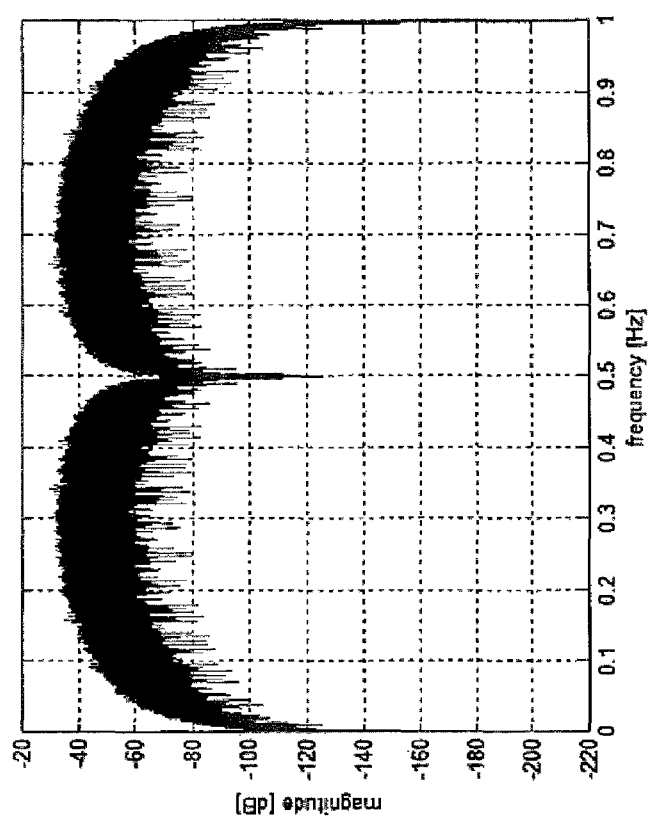
FIG. 7 shows an FFT spectrum of a pseudorandom binary sequence with spectral shaping using to a digital filter configuration as shown in FIG. 6.

FIG. 7 shows an example of an FFT spectrum of the spectrally shaped pseudorandom binary sequence y[k] as obtained when utilizing a digital filter configuration as illustrated in FIG. 6, i.e., a digital filter having a second order high pass characteristic. In FIG. 7, the frequency is denoted units of $F_{SH}$. As can be seen, the FFT spectrum shows damping towards low frequencies. Further, from a zero point at $F_{SH}/2$, it can be seen that approximation of a second order differentiator characteristic is not perfectly exact.

Figure 8:
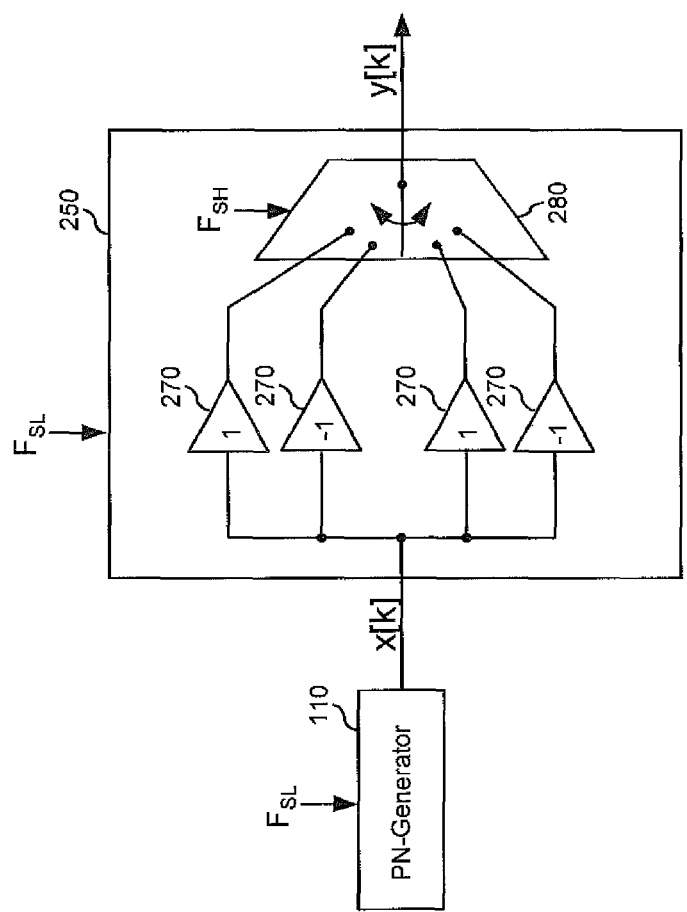
FIG. 8 shows a device according to an embodiment of the invention, which is based on a digital filter having a band pass filter characteristic.

FIG. 8 shows an example of a further device based on the architecture of FIG. 2, in which the digital filter 250 provides a second order band pass filter characteristic. This is achieved by a configuration of the digital filter 250 with four filter branches, i.e., L=4. The filter coefficient of the first filter branch is $c_1=1$, the filter coefficient of the second filter branch is $c_2=-1$, the filter coefficient of the third filter branch is $c_3=1$, and the filter coefficient of the fourth filter branch is $c_4=-1$. This implements a transfer function of the digital filter 250 which is given by $$H(z) = \frac{Z\{y[k]\}}{Z\{x[k]\}} = (1 - z^{-1} + z^{-2} - z^{-3}). \quad (3)$$

Figure 9:
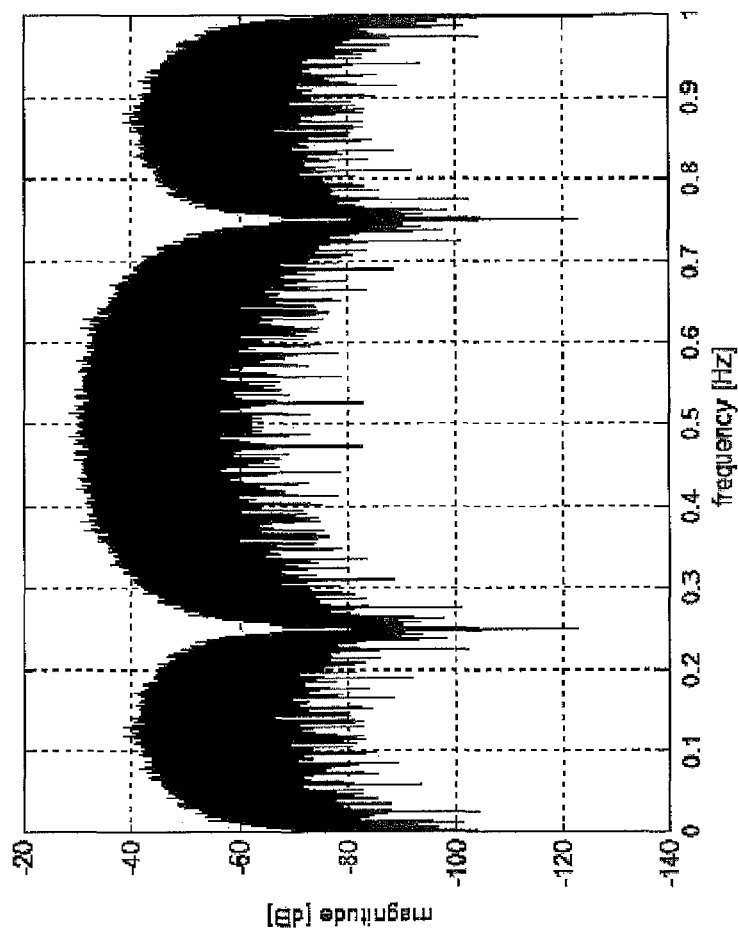
FIG. 9 shows an FFT spectrum of a pseudorandom binary sequence with spectral shaping using to a digital filter configuration as shown in FIG. 8.

FIG. 9 shows an example of an FFT spectrum of the spectrally shaped pseudorandom binary sequence y[k] as obtained when utilizing a digital filter configuration as illustrated in FIG. 8, i.e., a digital filter having a second order band pass characteristic. In FIG. 9, the frequency is denoted units of $F_{SH}$. As can be seen, the FFT spectrum shows a passband located around $F_{SH}/8$, with damping towards lower frequencies and towards $F_{SH}/4$.

As can be seen from the examples of FIGS. 3 to 9, various kinds of spectral shaping may be achieved by selecting different values of L and adapting the characteristics of the different branches. Here, it is to be understood that similar results could also be obtained when utilizing a device based on the architecture of FIG. 1.

Figure 10:
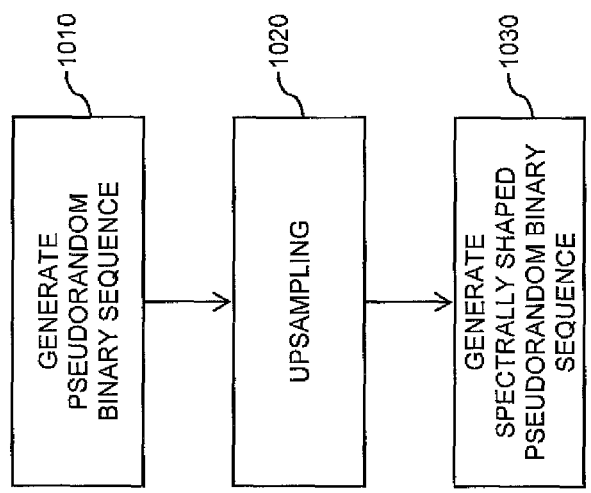
FIG. 10 shows a flowchart for schematically illustrating a method of generating a spectrally shaped pseudorandom sequence according to an embodiment of the invention.

FIG. 10 shows a flowchart for illustrating a method which may be utilized to implement the above principles of generating a spectrally shaped pseudorandom binary sequence. The method of FIG. 10 may for example be applied for operating a device having an architecture as illustrated in FIG. 1 or 2.

At step 1010, a pseudorandom binary sequence is generated. The pseudorandom binary sequence has a first sampling rate, e.g., the above-mentioned sampling rate $F_{SL}$. The pseudorandom binary sequence may for example be generated by an LFSR.

At step 1020, upsampling is performed. This may be accomplished by performing upsampling with zero stuffing on the pseudorandom binary sequence to generate an upsampled pseudorandom binary sequence having the second sampling rate, e.g., as described in connection with the architecture of FIG. 1. Further, this may be accomplished within a polyphase digital filter, by an multiplexer at the output of the polyphase digital filter, e.g., as described in connection with the architecture of FIG. 2.

At step 1030, a spectrally shaped pseudorandom binary sequence is generated based on the pseudorandom binary sequence. The spectrally shaped pseudorandom binary sequence has a second sampling rate equal to the first sampling rate multiplied by an integer upsampling factor of L>1. This is accomplished by a digital filter comprising L filter branches consisting of a first subset of one or more filter branches and a second subset of one or more filter branches. Each filter branch of the first subset generates a binary output which is equal to an input of the filter branch. Each filter branch of the second subset generates a binary output which is inverted with respect to an input of the filter branch. The digital filter may have a filter order of L−1.

The digital filter may be a polyphase filter and include a multiplexer which generates the spectrally shaped pseudorandom binary sequence by sequentially selecting one of the binary outputs of the filter branches. The multiplexer may also accomplish the upsampling of step 1020.

If at step 1020 an upsampled pseudorandom binary sequence having the second sampling rate is generated by upsampling with zero stuffing, the upsampled pseudorandom binary sequence may be received in a series of L−1 delay registers of the digital filter, such as the delay registers 160 of FIG. 1. Generating the spectrally shaped pseudorandom binary sequence may then also involve summing binary outputs of the filter branches, such as by the summation stage 180 of FIG. 1. In such case, the input signals of the filter branches may be formed by the upsampled pseudorandom binary sequence and a respective output of each delay register.

The spectrally shaped pseudorandom binary sequence may be a single bit signal. In some scenarios, the pseudorandom binary sequence and the spectrally shaped pseudorandom binary sequence may be based on signal values selected from −1 and 1. In other scenarios, the pseudorandom binary sequence and the spectrally shaped pseudorandom binary sequence may be based on signal values selected from 0 and 1.

If the spectrally shaped pseudorandom binary sequence is a single bit signal, it may for example be applied in scenarios where at least one switch is controlled by the spectrally shaped pseudorandom binary sequence. Further, the spectrally shaped pseudorandom binary sequence may allow for utilizing low complexity components when performing signal processing based on the spectrally shaped pseudorandom binary sequence. For example, for dithering purposes, the spectrally shaped pseudorandom binary sequence may be supplied to a single bit DAC.

Embodiments of the present invention, for example, may be applied to systems in which dithering is used to reduce the amplitude of spurious emissions caused by the harmonics of switching circuits. For example, in switched mode power supplies and class-D amplifiers, embodiment PN generators may be used to dither switching signals. This dithering spreads out the frequency content of high frequency harmonics and reduces RF interference. Such dithering may also allow switched-mode power supplies to operate at higher switching frequencies and still meet RF emission requirements compared to non-dithered systems. Embodiment PN systems may also be applied to audio analog-to-digital converters and digital-to-analog converters, such as sigma-delta converters to in order to reduce limit cycle behavior. As mentioned above, by providing a single-bit, spectrally shaped single-bit signal, dithering may be implemented using circuitry that is lower in complexity, uses less power, and consumes less circuit board space and/or silicon area than dithering circuits that use multi-bit techniques.

It is to be understood that the above-described concepts and embodiments are susceptible to various modifications. For example, the concepts may be applied with various kinds of PN-generators and digital filter architectures. For example, in some embodiments, the various circuit components, such as the disclosed PN generator 110, digital filter 250, delay registers 160, multiplier 270, summation stage 180, multiplexer 280 and other components may be implemented using hardware-based digital logic circuits known in the art. For example, components may be implemented using standard cell or fully custom logic may be fabricated on an integrated circuit. In some embodiments, the disclosed logical functions may be implemented using hardware such as a digital signal processor and/or processor circuits such as a microprocessor, microcontroller or combinations thereof.

What is claimed is:

1. A device, comprising:
   a pseudorandom sequence generator configured to generate a pseudorandom binary sequence having a first sampling rate; and
   a digital filter configured to generate, based on the pseudorandom binary sequence, a spectrally shaped pseudorandom binary sequence having a second sampling rate equal to the first sampling rate multiplied by an integer upsampling factor of L>1,
   the digital filter comprising L filter branches consisting of a first subset of one or more filter branches and a second subset of one or more filter branches,
   each filter branch of the first subset being configured to generate a binary output which is equal to an input of the filter branch, and
   each filter branch of the second subset being configured to generate a binary output which is inverted with respect to an input of the filter branch.

2. The device according to claim 1, wherein the digital filter is a polyphase filter and comprises a multiplexer configured to generate the spectrally shaped pseudorandom binary sequence by sequentially selecting one of the binary outputs of the filter branches.

3. The device according to claim 1, comprising:
   an upsampling stage configured to perform upsampling with zero stuffing on the pseudorandom sequence to generate an upsampled pseudorandom binary sequence having the second sampling rate.

4. The device according to claim 3,
   wherein the digital filter comprises a series of L−1 delay registers configured to receive the upsampled pseudorandom binary sequence and a summation stage configured to sum the binary outputs of the filter branches, the input signals of the filter branches being formed by the upsampled pseudorandom binary sequence and a respective output of each delay register.

5. The device according to claim 1, wherein the spectrally shaped pseudorandom binary sequence is a single bit signal.

6. The device according to claim 5, wherein the pseudorandom binary sequence and the spectrally shaped pseudorandom binary sequence comprise signal values selected from −1 and 1.

7. The device according to claim 5, wherein the pseudorandom binary sequence and the spectrally shaped pseudorandom binary sequence comprises signal values selected from 0 and 1.

8. The device according to claim 5, comprising:
   at least one switch which is controlled by the spectrally shaped pseudorandom binary sequence.

9. The device according to claim 1, wherein the digital filter has a filter order of L−1.

10. The device according to claim 1, wherein the pseudorandom sequence generator comprises a linear feedback shift register.

11. A method, comprising:
   generating a pseudorandom binary sequence having a first sampling rate; and
   by a digital filter comprising L filter branches consisting of a first subset of one or more filter branches and a second subset of one or more filter branches, generating a spectrally shaped pseudorandom binary sequence based on the pseudorandom binary sequence, the spectrally shaped pseudorandom binary sequence having a second sampling rate equal to the first sampling rate multiplied by an integer upsampling factor of L>1, each filter branch of the first subset generating a binary output which is equal to an input of the filter branch, and each filter branch of the second subset generating a binary output which is inverted with respect to an input of the filter branch.

12. The method according to claim 11, wherein the digital filter is a polyphase filter and comprises a multiplexer which generates the spectrally shaped pseudorandom binary sequence by sequentially selecting one of the binary outputs of the filter branches.

13. The method according to claim 11, comprising:

performing upsampling with zero stuffing on the pseudorandom sequence to generate an upsampled pseudorandom binary sequence having the second sampling rate.

14. The method according to claim 13, comprising:

receiving the upsampled pseudorandom binary sequence in a series of L−1 delay registers of the digital filter; and summing binary outputs of the filter branches, the input signals of the filter branches being formed by the upsampled pseudorandom binary sequence and a respective output of each delay register.

15. The method according to claim 11, wherein the spectrally shaped pseudorandom binary sequence is a single bit signal.

16. The method according to claim 15, wherein the pseudorandom binary sequence and the spectrally shaped pseudorandom binary sequence comprise signal values selected from −1 and 1.

17. The method according to claim 15, wherein the pseudorandom binary sequence and the spectrally shaped pseudorandom binary sequence comprises signal values selected from 0 and 1.

18. The method according to claim 15, comprising:

controlling at least one switch by the spectrally shaped pseudorandom binary sequence.

19. The method according to claim 11, wherein the digital filter has a filter order of L−1.

20. The method according to claim 11, generating the pseudorandom binary sequence by a linear feedback shift register.

* * * * *